Dec. 8, 1959 C. W. TYSON 2,916,435
SEPARATION OF POLYMER FROM HYDROFORMATE
Filed Oct. 1, 1953
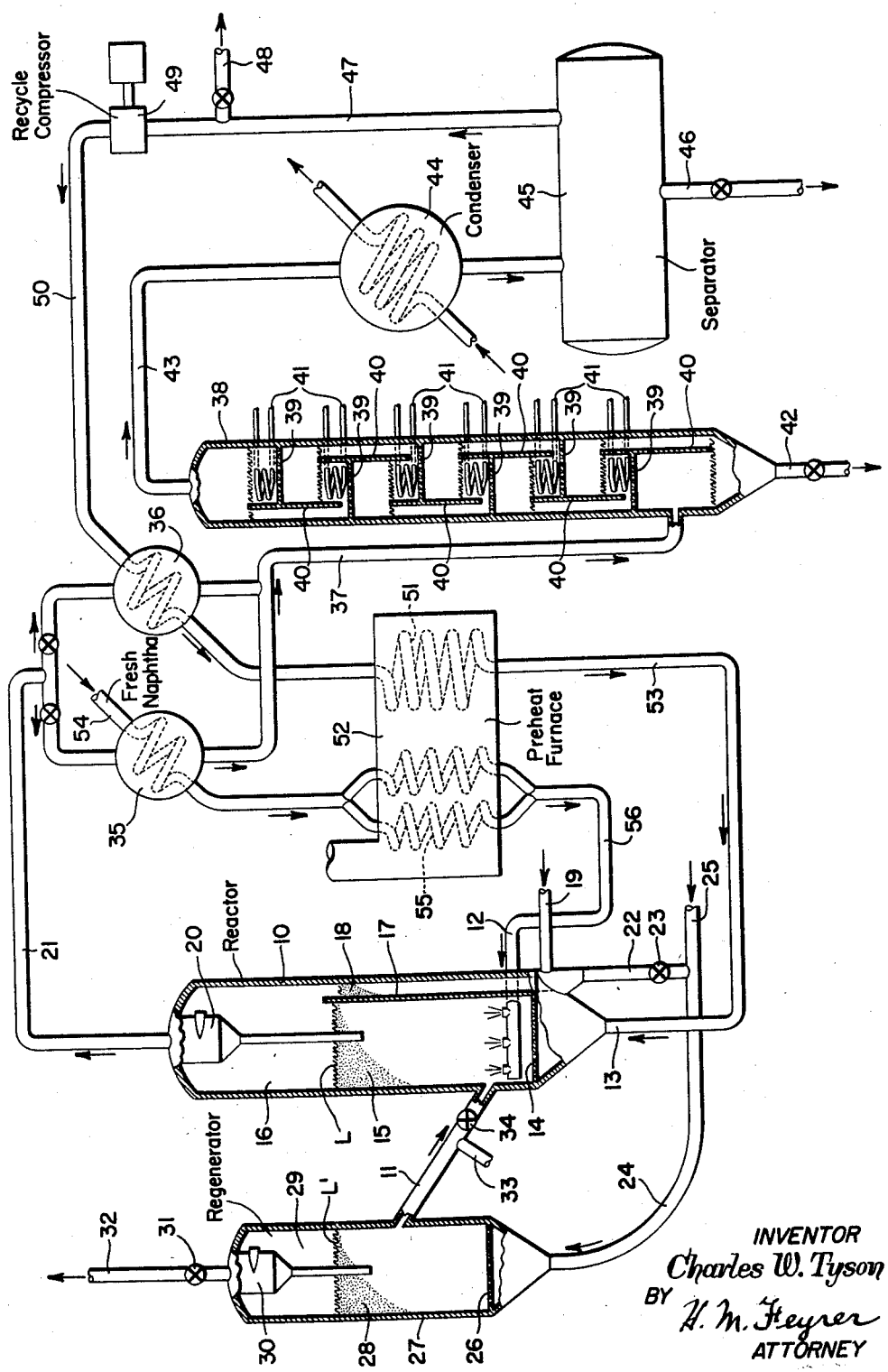
INVENTOR
Charles W. Tyson
BY
ATTORNEY United States Patent Office 2,916,435
Patented Dec. 8, 1959

2,916,435

SEPARATION OF POLYMER FROM HYDROFORMATE

Charles W. Tyson, Summit, N.J., assignor to Esso Research and Engineering Company, a corporation of Delaware Application October 1, 1953, Serial No. 383,581

2 Claims. (Cl. 208—95)

The present invention pertains to the recovery or separation of polymer and particularly to the separation of polymer from a hydroformate product by fractionation condensation.

Hydroforming is a well known and widely used method for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas at temperatures of 750–1150° F. in the pressure range of about 50–1000 lbs. per sq. inch and in contact with such catalysts as molybdenum oxide, chromium oxide, or in general, oxides or sulfides of metals of groups IV, V, VI, VII and VIII of the periodic system of elements, alone, or generally supported on a base or spacing agent such as alumina gel, precipitated alumina or zinc aluminate spinel. It has also been proposed to reform or hydroform naphtha fractions in contact with catalysts consisting essentially of small amounts of platinum or palladium dispersed upon an aluminous support.

The principal reactions involved in hydroforming are the dehydrogenation of naphthenes in the feed to the corresponding aromatics, isomerization of normal paraffins to form branch chain paraffins and also naphthenes, aromatization of paraffins and hydrocracking. In the process of hydroforming, the product usually contains small amounts, generally less than about 4% based upon feed of higher boiling polymer. In the ordinary hydroforming operation, this material is present in the hot reaction products in vaporized form under a pressure of about 50 to 800 lbs. per sq. inch, usually about 200 lbs. per sq. inch when employing non-precious metal catalysts and 200 to 600 lbs. per sq. inch when using precious metal catalysts in admixture with motor fuel product vapors and recycle and make gases in the range of 2000 to 5000 cu. ft. per barrel of naphtha feed.

It is economically desirable to remove all the polymer without removing any of the gasoline fractions during the cooling and condensing operations so that rerunning of the condensed product may be eliminated. It has been found, however, that by single stage partial condensation it is necessary to condense approximately 15% of the total product in order to be sure that no polymer will remain in the uncondensed portion. The polymer may amount to 0.2% to 4% depending on feed stock and operating conditions. This means, of course, that this 15% or condensed fraction must be rerun in order to make an effective separation between the polymer and the valuable gasoline or motor fuel constituents in said condensed fraction. Moreover, due to the small amount of polymer present and its very wide boiling range and also due to the presence of large amounts of non-condensible gas, the heat absorption required to condense successively increasing portions of the product, is very large. Because of this, if a normal fractionation process was used, the amount of reflux between plates would be such that fractionation would be very difficult.

It is the object of this invention to provide the art with a simple, effective method for removing polymer from hydroformate.

It is also the object of this invention to provide a simple method for removing polymer from hydroformate by fractionation-condensation.

These and other objects will appear more clearly from the detailed specification and claims which follow.

It has now been found that polymer can be effectively removed from hot, vaporous, hydroforming reaction products by removing heat from each of the bubble trays within the fractionation column instead of removing heat from the top of the column. It is possible in this way to use only a nominal amount of reflux and still obtain reasonable fractionation of the hydroformate so that the bottoms product will be sufficiently free of gasoline fractions that rerunning thereof is not necessary. The exact means for effecting removal of heat can be determined by economic methods but may include, for example, the use of indirect cooling means within the tower itself or the removal of a stream of liquid from each tray, cooling the withdrawn liquid several degrees and returning the cooled liquid to the opposite side of the tray from which it was removed. By this means, adequate heat removal can be achieved without having excessive liquid travel from plate to plate.

Reference is made to the accompanying drawing illustrating a diagrammatic flow plan of one embodiment of the present invention.

In the drawing, 10 is a reactor vessel provided with an inlet line 11 for the supply of catalyst, an inlet line 12 for the supply of preheated naphtha vapors and an inlet line 13 for the introduction of hydrogen-rich or recycle gas into the base of the reactor vessel. If desired, a perforated plate or grid may be arranged at the lower part of the reactor vessel in order to insure uniform distribution of the incoming gas over the entire cross section of the vessel. Although separate inlet lines are shown for the catalyst, naphtha feed and recycle gas, it is possible to supply the naphtha feed and recycle gas through a common inlet line or to discharge freshly regenerated catalyst into a transfer line where it is picked up by the recycle gas and carried into the reactor. A charge or bed of finely divided hydroforming catalyst particles is established in the reactor vessel 10 above the grid 14. Suitable catalysts include group VI metal oxides such as molybdenum, chromium or tungsten oxides or mixtures thereof, preferably upon a support or carrier such as activated alumina, zinc aluminate spinel or the like. Other catalysts such as platinum or palladium upon a support such as activated alumina or the like may be used. The catalyst particles are, for the most part, between 200 and 400 mesh in size or about 0–200 microns with a major proportion between about 20 and 80 microns. The naphtha and hydrogen-containing gas are passed as a mixture up through the reaction zone at a superficial velocity of about 0.2 to about 1.3 ft. per second at reactor conditions depending upon the pressure. For example, the superficial velocity of the gas and feed vapors through the reactor 10 should be about 0.6 to 0.9 ft. per second in the pressure range of 200–250 lbs. per sq. inch gauge. The velocity should be sufficient to maintain a dense, turbulent, liquid simulating bed 15 of solids and gas, having a definite level L with a dilute phase suspension 16 of solids in gas thereabove. Lower linear velocities are used for higher pressures to obtain dense fluidized beds. If desired, the reactor vessel 10 may be provided with horizontally arranged perforated baffles spaced vertically therein or with vertically arranged and spaced baffles to improve the contacting of the hydrocarbon vapors with the catalyst.

A vertical internal conduit 17 is arranged within the reactor for the withdrawal of catalyst directly from the dense bed 15. The upper end of the conduit 17 extends above the level L of the dense bed 15 and has an opening or port to permit flow of catalyst particles from bed 15 into the conduit 17. More than one orifice or port may be provided at different levels in conduit 17 and each port may be provided with a valve or control means to regulate the flow of catalyst into the withdrawal conduit 17.

Steam or an inert gas such as nitrogen or scrubbed flue gas or the like or mixtures thereof are supplied to conduit 17 through inlet line 19 near the base of conduit 17 to displace, strip off or desorb hydrogen, hydrocarbon reactants or reaction products flowing into conduit 17 with the catalyst particles, the stripping gas passing upwardly through conduit 17 countercurrent to the downflowing catalyst. The superficial velocity of the stripping gas through conduit 17 should be equal to or higher than the superficial velocity of the vapors and gases passing upwardly through the dense bed 15 in reactor 10.

The stripping gas and stripped out constituents are discharged from the top of conduit 17 into dilute phase 16 and are combined with the reaction product vapors leaving the dense bed 15. The resultant mixture is then passed through one or more cyclone separators 20 or the like to remove entrained catalyst particles whereupon the products substantially free of catalyst are withdrawn through products outlet line 21. Stripping the catalyst particles during withdrawal from the reactor vessel decreases the amount of combustible material that must be burned during the regeneration of the catalyst. If desired, a separate external stripping vessel may be used for the stripping step with the stripping gas and strippedout material leaving the top of the stripper passing to the dilute phase 16 in the reactor and thence to product outlet line 21 to separate recovery means.

The lower end of conduit 17 is connected to conduit 22 of smaller diameter and forms therewith a standpipe for developing fluistatic pressure in the spent catalyst sufficient to facilitate its flow into the regeneration system. Under the elevated pressure conditions obtaining in the hydroforming reactor system, the spent catalyst flowing from the stripper into standpipe 22 will carry sufficient entrained or trapped gas with it to maintain the catalyst in a free flowing or fluid condition. If necessary, however, some additional aeration gas may be added at one or more points along the standpipe 22. A slide valve 23 is provided near the base of the standpipe to control the rate of withdrawal of stripped catalyst from the standpipe. Spent catalyst is discharged from the base of standpipe 22 into transfer line 24 where the catalyst particles are picked up by a stream of air or other carrier gas supplied through inlet line 25 and conveyed thereby through perforated plate or grid 26 into regenerator vessel 27 where the carbonaceous deposits are burned off the catalyst particles. Since the rate of burning of carbonaceous deposits upon hydroforming catalysts at system pressures is very high and tends to cause overheating of the catalyst particles, it is advisable to use an inert gas such as nitrogen or flue gas or only a portion of the regeneration air to convey the spent catalyst through conduit 24 and to introduce the air or the remainder of the air necessary for regeneration directly into the regenerator, preferably at spaced points and through a plurality of nozzles in order to insure uniformity of temperature throughout the body of catalyst undergoing regeneration. It is ordinarily preferred to provide cooling coils in the regenerator in order to limit or control the temperature of the catalyst undergoing regeneration.

The velocity of the gas passing upwardly through the regenerator is controlled to maintain a dense, highly turbulent, fluidized bed 28 of catalyst and gas in the lower part of the regenerator vessel, said bed having a definite level L' with a dilute phase 29 or dispersion of catalyst in regeneration gas thereabove. To accomplish this, the superficial velocity of the regenerating gas in regenerator 27 may range from 0.3 to 1.5 ft. per second depending upon the pressure, for example at below about 1.0 ft. per second at a regeneration pressure of about 200–250 lbs. per sq. inch. Regeneration gases are taken overhead from regenerator dense bed 28 through one or more cyclone separators 30 or other such means which remove entrained catalyst therefrom. The regeneration gases then pass through pressure reducing valve 31 to stack or flue 32 or to suitable scrubbing and storage equipment if the regeneration gases are to be used as a stripping or carrier gas in the system. In order to control the amount of catalyst in the system, suitable lock hoppers and/or slurry pumps are provided for the introduction of catalyst and pressure reducing valves and hoppers for the withdrawal of catalyst.

Catalyst is withdrawn directly from the dense bed 28 for recycling to the reactor vessel. Withdrawal may be into transfer line 11 into which suitable stripping gas can be introduced as through inlet line 33. Alternatively, a separate stripping cell similar to conduit 17 in reactor 10 may be arranged within the regenerator 27 or a separate external stripper cell can be provided to free the regenerated catalyst of entrained regeneration gases. The catalyst in the preferred embodiment shown passes through control or slide valve 34 and thence directly into the reactor vessel 10 without contacting hydrogen or hydrogen-containing gas. If desired, however, the regenerated catalyst may be given a pretreatment or partial reduction with hydrogen before discharging the same into the reactor vessel. This can be done by discharging the stripped regenerated catalyst into a transfer line through which at least a part of the hydrogen-rich recycle gas is supplied to the reactor vessel or the regenerated catalyst may be treated alone or in admixture with equilibrium reactor catalyst for temperature control in a separate pretreating zone or vessel arranged between the regenerator and the reactor. The reactor and regenerator and the method of operation thereof described above are essentially conventional fluid operations and form no part of this invention.

In accordance with this invention, the reaction products, which could also be obtained from a fixed or moving bed type of operation rather than from the fluidized solids process illustrated, passing through product outlet line are passed through heat exchanger 35 and/or heat exchanger 36 where they may serve to preheat feed streams to the reaction zones. The partially cooled product vapors are then passed through line 37 into fractionating column 38. Column 38 is equipped with a plurality of bubble cap or perforated plate type trays 39, each of which is provided with a conventional downcomer 40 or conduit for maintaining a definite level of liquid on each plate and for conducting the excess liquid from each plate to the next lower plate. In accordance with this invention, each of the trays in the fractionating column 38 is provided with means for removing heat from the liquid layer on the tray. In the embodiment illustrated, the drawing heat is removed from the liquid on each tray 39 by circulating a cooling fluid through cooling coils 41. While each of the cooling coils 41 may be separately controlled, it is possible to combine two or more cooling coils and provide a single control for several plates. Also, instead of circulating a cooling fluid through cooling coils arranged as shown, the desired cooling effect can be obtained by removing liquid from each plate or tray, cooling the withdrawn liquid several degrees and returning the cooled liquid to the same tray. In the latter arrangement, it would be preferable to remove liquid from the region near the point of overflow into the downcomer or outlet side of the plate and to return the cooled liquid to the opposite or inlet side of the plate or tray. By removing heat from each of the trays, it is possible to effect the condensation of polymer and under conditions which are so controlled that essentially none of the gasoline constituents are condensed. Condensed polymer accumulates at the bottom of column 38 and is withdrawn through valve controlled outlet line 42.

Reaction products substantially free of polymer are taken overhead from column 38 through line 43 and are passed through condenser 44 wherein the liquid consituents in the product stream are condensed whereupon the cooled product is then discharged into separator 45. Liquid hydroformate is withdrawn from separator 45 through draw off line 46. Hydrogen-rich gas is removed from the separator 45 through line 47 and the excess or make gas is rejected from the system through outlet line 48. The remainder or recycle gas is compressed in pump 49 for recycling to the reactor. The compressed recycle gas is passed via line 50 through heat exchanger 36 wherein it is partially preheated by indirect heat exchange with the hot hydroformer reaction products. The partially preheated recycle gas is then preheated to the desired temperature, for example, 1150–1200° F., by passage through coils 51 in furnace 52. The preheated recycle gas is then supplied via line 53 to inlet line 13 through which it passes into the reactor vessel 10. Fresh naphtha feed is supplied through line 54 and is passed through heat exchanger 35 wherein it is partially preheated by indirect heat exchange with hot hydroformer reaction products. The partially preheated naphtha feed is then passed through coils 55 in preheat furnace 52 wherein it is heated approximately to reactor temperature or to as high as 1000° to 1050° F. if desired. The preheated naptha vapors are supplied via line 56 to feed inlet line 12 through which they pass into the reactor.

The present process is applicable to the product obtained by the hydroforming or aromatizing of virgin naphtha, cracked naphtha, Fischer-Tropsch naphtha or the like of a broad boiling range, i.e. from about 180–430° F. or it may also be applied to the product obtained by the hydroforming of a narrow boiling fraction such as a $C_6$–$C_7$ cut. Catalysts that may be used in the hydroforming treatment include the common hydroforming catalysts such as the group VI metal oxides or sulfides or metals such as platinum or palladium upon suitable supports or spacing agents. Catalysts containing about 8–12 wt. percent molybdenum oxide or about 20 to 40 wt. percent chromium oxide upon activated alumina or zinc aluminate spinel or from about 0.01 to 2.0 wt. percent of platinum or 0.05 to 5.0 wt. percent of palladium upon activated alumina are particularly suitable.

The hydroforming or aromatizing operation can be carried out in fixed or moving beds of catalyst or preferably in a fluidized solids system as illustrated. The reaction is effected at pressures of about 50–750 lbs. per sq. inch, preferably 200–250 p.s.i.g. at temperatures of about 850° to 1050° F., preferably at about 900–1000° F. The throughput of naphtha or fresh feed should be about 0.2 to 2.0 w./hr./w., preferably 0.5 to 1.0 w./hr./w. with recycle gas of 40 to 80 volume percent hydrogen content used at the rate of 2000–6000 cu. ft. per barrel of fresh feed. The weight ratio of catalyst to oil introduced into the reactor should be about 0.5 to about 5.0. It is ordinarily preferred to operate at catalyst to oil ratios of about 1 since ratios above about 1 to 1.5 result in excessive carbon formation. Somewhat higher weight ratios can be used at higher pressures.

In conventional operations the reactor products after heat exchange would enter the scrubber at 400° to 600° F. In order to remove polymer amounting to about 1% by volume on feed by condensation in a single stage, approximately 15% of the net overhead product would have to be condensed. This would reduce the temperature to about 260° F. with a net cooling load of 70 to 100 mm. B.t.u./hr. for a 20,000 b./d. plant. In this invention, however, the reactor products need only to be cooled to about 310° F. with a net heat load of 40 to 70 mm. B.t.u./hr. Furthermore, whereas the conventional system would yield a polymer product containing only 5 to 10% polymer which would need to be reprocessed, this invention would yield a product of essentially pure polymer. Again further, this invention will permit heat removal at a significantly higher temperature level thereby permitting more economical heat exchange and increased heat economy.

The foregoing description contains a limited number of embodiments of the present invention. It will be understood, however, that numerous variations are possible without departing from the scope of this invention.

What is claimed is:

1. In the process of hydroforming hydrocarbon fractions boiling within the motor fuel range, the steps which comprise withdrawing hot reaction products from the hydroforming reaction zone, passing said reaction products through a fractionation column containing several plates, cooling the liquid on each of the plates in said column by indirect heat exchange with a suitable coolant sufficiently to condense high boiling polymer without condensing motor fuel constituents, withdrawing polymer substantially free of motor fuel constituents from the base of said column and withdrawing hydroformate product substantially free of polymer from the top of said column.

2. In the process of hydroforming hydrocarbon fractions boiling within the motor fuel range, the steps which comprise withdrawing hot reaction products from the hydroforming reaction zone, passing said reaction products through a fractionation column containing several plates, withdrawing liquid from each of the plates in the column, cooling the withdrawn liquid and returning the cooled liquid to the same plate from which it was withdrawn thereby cooling the liquid in said column sufficiently to condense high boiling polymer without condensing motor fuel constituents, withdrawing polymer substantially free of motor fuel constituents from the base of said column and withdrawing hydroformate product substantially free of polymer from the top of said column.

References Cited in the file of this patent

UNITED STATES PATENTS

| | | |
|---|---|---|
| 1,916,205 | Cross | July 4, 1933 |
| 2,018,986 | Whitman | Oct. 29, 1935 |
| 2,044,764 | Bywater | June 23, 1936 |
| 2,663,676 | Cardwell et al. | Dec. 22, 1953 |
| 2,758,068 | Howard | Aug. 7, 1956 |